United States Patent
Wells et al.

(10) Patent No.: US 11,888,319 B1
(45) Date of Patent: Jan. 30, 2024

(54) CONTROLLING VIRTUAL MICROGRIDS IN A POWER NETWORK

(71) Applicant: PXiSE Energy Solutions, LLC, San Diego, CA (US)

(72) Inventors: Charles H. Wells, San Diego, CA (US); Raymond A. de Callafon, San Diego, CA (US); Patrick T. Lee, San Diego, CA (US)

(73) Assignee: PXISE ENERGY SOLUTIONS, LLC, San Diego, CA (US)

( * ) Notice: Subject to any disclaimer, the term of this patent is extended or adjusted under 35 U.S.C. 154(b) by 0 days.

(21) Appl. No.: 18/223,806

(22) Filed: Jul. 19, 2023

Related U.S. Application Data

(60) Provisional application No. 63/390,599, filed on Jul. 19, 2022.

(51) Int. Cl.
*H02J 3/18* (2006.01)
*H02J 13/00* (2006.01)

(52) U.S. Cl.
CPC .......... *H02J 3/18* (2013.01); *H02J 13/00002* (2020.01); *H02J 13/00007* (2020.01)

(58) Field of Classification Search
None
See application file for complete search history.

(56) References Cited

U.S. PATENT DOCUMENTS

| | | | |
|---|---|---|---|
| 10,452,032 B1 * | 10/2019 | de Callafon | H02J 3/322 |
| 10,599,107 B2 * | 3/2020 | Fuchs | G05B 15/02 |
| 10,742,068 B2 * | 8/2020 | de Callafon | G01R 19/2513 |
| 11,159,044 B2 * | 10/2021 | Lian | H02J 3/381 |
| 2012/0191440 A1 * | 7/2012 | Meagher | G06F 30/00 703/18 |
| 2013/0253718 A1 * | 9/2013 | Meagher | G06N 5/045 700/291 |
| 2016/0156190 A1 * | 6/2016 | Wells | H02J 3/381 307/18 |
| 2017/0179720 A1 * | 6/2017 | Porter | H02J 3/16 |
| 2017/0346286 A1 * | 11/2017 | Wells | H02J 3/38 |

(Continued)

OTHER PUBLICATIONS

Yazdanian et al., "Distributed Control Techniques in Microgrids", 2014, IEEE Transactions on Smart Grid, vol. 5, No. 6, Nov. 2014. (Year: 2014).*

(Continued)

*Primary Examiner* — Mohammad Ali
*Assistant Examiner* — Kelvin Booker
(74) *Attorney, Agent, or Firm* — Gray Ice Higdon

(57) ABSTRACT

Implementations are directed to achieving a real-time and distributed control solution that can at least selectively achieve a deterministic flow of power at a virtual point of interconnection (vPOI) of a virtual microgrid, where there is limited or no power measurement data available at the vPOI. Some of those implementations are directed to automatically generating virtual microgrids for a power network, optionally including generating additional and/or alternative virtual microgrids in response to transient and/or persistent changes to the power network. Some of those implementations are additionally or alternatively directed to dynamic control of a virtual microgrid to achieve the deterministic flow of power at the vPOI thereof.

21 Claims, 9 Drawing Sheets

(56) References Cited

U.S. PATENT DOCUMENTS

| | | | | |
|---|---|---|---|---|
| 2018/0026445 A1* | 1/2018 | Kalsi | ............... | H02J 13/00017 705/37 |
| 2018/0088545 A1* | 3/2018 | Fuchs | ................... | G05B 15/02 |
| 2019/0020220 A1* | 1/2019 | Lian | ....................... | H02J 13/00 |
| 2019/0245346 A1* | 8/2019 | Barker | .................... | H02J 1/12 |
| 2020/0076192 A1* | 3/2020 | Kalsi | ....................... | H02J 3/16 |
| 2021/0210957 A1* | 7/2021 | Du | ............................ | H02J 3/12 |
| 2021/0293893 A1* | 9/2021 | Hassan | ................. | G01R 31/40 |
| 2022/0115869 A1* | 4/2022 | Metcalfe | .................. | H02J 3/18 |
| 2022/0190600 A1* | 6/2022 | Metcalfe | ............... | G01R 29/18 |

OTHER PUBLICATIONS

Xiao, "A Control strategy for Honeycomb Distribution Network", 2020, 2020 Asia Energy and Electrical Engineering Symposium. (Year: 2020).*

Vasquez et al., "Hierarchical Control of Intelligent Microgrids: Integration of Distributed Energy Resources into the Smart Grid", 2010, Digital Object Identifier 10.1109/MIE.2010.938720. (Year: 2010).*

Shahgholian, "A brief review on microgrids: Operation, applications, modeling, and control", Sep. 2020, Int Trans Electr Energ Syst. 2021;31:e12885. (Year: 2020).*

Mohammadi, "Robust Control Strategies for Microgrids: A Review", Oct. 2020,, IEEE Systems Journal, vol. 16, No. 2, Jun. 2022 2401. (Year: 2020).*

Lu et al., "Distributed impulsive control for islanded microgrids with variable communication delays", Feb. 2016, IET Control Theory Appl., 2016, vol. 10 Iss. 14, pp. 1732-1739. (Year: 2016).*

Kazemlou, "Stability of the Small-Scale Interconnected DC Grids via Output-Feedback Control", Sep. 2016, IEEE Journal of Emerging and Selected Topics in Power Electronics, vol. 5, No. 3, Sep. 2017. (Year: 2016).*

* cited by examiner

CONTROLLING VIRTUAL MICROGRIDS IN A POWER NETWORK

BACKGROUND

Various factors are causing electric power grids to become less secure with reduced reliability. Such factors can include higher levels of intermittent distributed renewable power being injected into the grid, less spinning inertia from conventional generation, and/or disruptive loads such as those from Electric Vehicle (EV) charging systems.

As a particular example, many distributed electricity generation resources are inverter-based and provide no spinning inertia to help stabilize the grid. This can result in less (or even no) system spinning inertia as large and centralized power generators, with spinning inertia, are decommissioned or temporarily taken off-line. These large and centralized power generators provide both voltage and power support, often referred to as "stiffness". When large generators are decommissioned or are temporarily taken off-line, the voltage and frequency of the grid will change rapidly (e.g., the frequency will lower). Often, a low system frequency and/or a rapid change of the system frequency will trigger under-frequency load shed action(s). This can blackout designated neighborhoods and sometimes even affect the entire power grid. Under-frequency events can occur more often on islanded or otherwise remote grids, but can also occasionally occur on large regional grids as more variable renewable supplies are integrated. To accommodate these dynamic changes in the grid, fast distributed control systems can be required.

One technique for improving the control of a dynamic grid is to organize the power system into a network of controllable real microgrids. By designing and installing real microgrids at various points in the distribution grid, the overall power system control can be managed in a distributed fashion. However, for this to work, the physical microgrid controllers associated with the real microgrids must be installed at corresponding locations. Further, they must be able to hold specified setpoints by managing their corresponding internal electric demand and corresponding supply resources, and should be able to achieve certain functionality, such as that described in the IEEE 2030.7 Standard for Microgrid Controllers. The point of interconnection (POI) of a microgrid to the main grid is defined as either a single point or an aggregation of multiple points within a main grid, at which actual real and reactive power flow is physically measured. The setpoints for the real and reactive power flowing through the POI are usually specified by another higher-level controller to achieve a specific system objective.

Contrary to the controllable microgrid concept with respect to a POI of the microgrid, traditional demand response systems that dispatch to loads behind customer meters only partially influence the desired response at the POI and on the distribution network. This is due to the overall influence of uncontrolled loads behind the meter and of variable renewables and available energy storage units. One example is a demand response system that controls water heaters. This is a common practice in many parts of the world, such as the Energy Queensland Audio Frequency load control system. The demand response system controls the on-off state of water heaters in residential households. Over one million of these systems are in operation at Energy Queensland. The demand response system turns on-off devices in branches and segments of distribution feeders by adding a tone to the power line, such as a tone that is around 1 kHz. This approach does not control the power control target at the POI due to uncontrolled loads behind the meter and/or other variable supplies such as renewables and energy storage units. For example, if the control command is to turn the water heater on, there is no assurance that there will be additional power flow if the water is already hot. Similarly, if the command is to turn the water heater off, it may already be off since the water is already hot. Thus, there is no deterministic control at the POI using the traditional demand response method alone, partly because many distribution network nodes do not have existing measurements available for more accurate power control.

Similarly, the participation and dispatch of power resources behind the meters in energy markets is another example of inability to control the power at a POI of a microgrid. For example, in the Southwest Australia distributed energy resource (DER) market, customers bid into the energy markets using their residential batteries. The bids are to deliver power to the grid through their POI, but only the batteries are dispatched. For example, a customer bids 10 kW into the market at 1300 hours for two hours, and if the bid is accepted by the Market, the battery will be dispatched by the market to output 10 kW at 1300 hours. It is important to point out that the bid is for power intended and measured at the POI. The dispatch of the batteries alone does not provide adequate control of power at the POI because the variation of the load behind the meter will affect the amount of power that is delivered to the grid through the POI. As a result, the power bid into the market is not delivered and the customer does not get a full payment for the power dispatched from the batteries.

SUMMARY

Implementations of the present disclosure are directed to achieving a real-time and distributed control solution that can at least selectively achieve a deterministic flow of power at a virtual point of interconnection (vPOI) of a virtual microgrid, where there is limited or no power measurement available at the vPOI. Some of those implementations are directed to automatically generating virtual microgrids for a power network, optionally including generating additional and/or alternative virtual microgrids in response to determined transient and/or persistent changes to the power network. Some of those implementations are additionally or alternatively directed to dynamic control of a virtual microgrid to achieve the deterministic flow of power at the vPOI thereof.

Various implementations directed to dynamic control a virtual microgrid control current power flow setpoints for a vPOI for the virtual microgrid. The virtual microgrid includes the vPOI and includes a plurality of electrical resources that are topologically behind the vPOI. The electrical resources include one or more automatically controllable resources. Those various implementations further generate current estimated power flow measurements for the vPOI. Those various implementations further generate, based on processing the current power flow setpoints and the current estimated power flow measurements using at least an integral action feedback controller, one or more control actions to achieve the current power flow setpoints, and cause transmission of the one or more control actions to one or more of the automatically controllable resources that are topologically behind the vPOI. Some of the various implementations generate the current estimated power flow measurements without utilizing any actual measurement of the power flow at the vPOI and, optionally, without utilizing corresponding real measurements for all of the electrical resources that are topologically behind the vPOI. Rather, the flow measurements can be estimated using state estimation technology.

Various implementations directed to automatically generating virtual microgrids identify a branch in a graph of a power network and generate, based on identifying the branch in the graph of the power network, a virtual microgrid that includes a vPOI at the branch intersection and that includes automatically controllable resources based on the automatically controllable resources being topologically behind the vPOI. Those various implementations can further cause, in response to generating the virtual microgrid, operation of a virtual microgrid controller, for the virtual microgrid. For example, operating the virtual microgrid can include controller can include processing, using the virtual microgrid controller, power flow setpoints for the vPOI and estimated power flow measurements for the vPOI to generate control actions for achieving the power flow setpoints at the vPOI, and causing transmission of the generated control actions to one or more of the automatically controllable resources to achieve the power flow setpoints at the vPOI.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
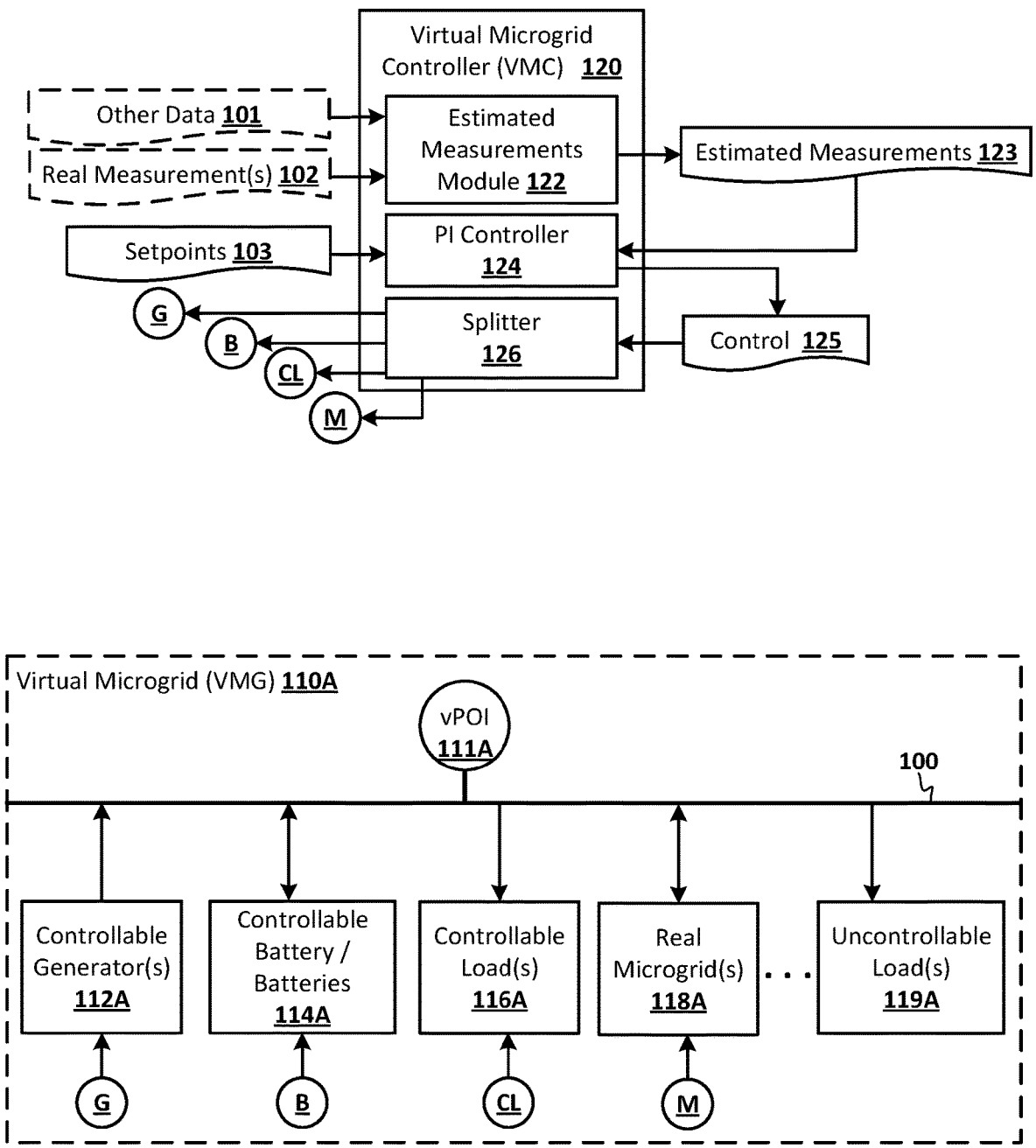
FIG. 1A schematically depicts an example virtual microgrid and example virtual microgrid controller, in accordance with various implementations.

Prior to turning to the figures, a non-limiting overview of various implementations is provided.

To manage power distribution networks with high percentages of controllable distributed resources, power flows at designated connection points, such as the POIs of microgrids, should be directly controlled. Such POIs are normally physically measured using a utility grade meter. These real measurements can be used in feedback control loops to regulate the voltage magnitude and angle at POIs using controllable resources behind the POI. In traditional distribution networks, the real and reactive power flow is uncontrolled at the POIs due to changing magnitude and duration of the loads and varying renewable supplies. POI control is not common in electric power networks but can be achieved using microgrid control technology. Power flows at these points can be controlled with, for example, IEEE 2030.7 compliant real microgrid controllers, such as those that are physically coupled to the electric power networks. The microgrid control systems require a real physical measurement at the POI, along with a specified setpoint reference.

Most automatically controllable resources, such as DER and controllable loads, are behind the meter. When controlling the grid using distributed power sources, it can be important to regulate each POI as a building block in a hierarchical grid control system. The uncontrolled loads and generation behind the meter must be managed by feedback control to achieve a desired POI power flow. This is necessary to achieve overall control of the grid by the aggregation of the controlled power flows at each POI.

In conventional electric power networks, POIs are uncontrolled. They are simply metering points measuring the sum of all the loads behind the meter. Sending commands directly from the utility to controllable DERs behind the meter does not necessarily result in a corresponding flow at the POI due to the uncontrolled generation and load variations behind the meter. For example, a typical commercial or residential meter will have several power devices that contribute to the metered energy flow. Such devices can include, for example, an air-conditioning unit, a water heater, a dishwasher, a dryer, a refrigerator, a pool pump, solar generation, a battery, an electric vehicle charger, and/or other electrical device(s). Typically, one or several of these power devices are controllable and can be used to control the flow at the POI of a microgrid. In general, the microgrid controller will use real and reactive power measurements at the POI for closed-loop control to achieve deterministic control of real and reactive power flow at the POI.

To further expand the application and benefits of controllable microgrids, implementations disclosed herein utilize a virtual microgrid approach, which can utilize an estimated measurement at a POI to achieve continuous power control. Such a POI, that lacks an actual total power measurement available (i.e., lacks any actual physical measurement at the POI itself), can be considered as a virtual POI (vPOI) of a virtual microgrid to the main grid. The vPOI can be defined as a single point or an aggregation of multiple points of power flow in the network, where the total power flow is estimated instead of measured. Put another way, there is no actual physically measured total power flow at the single point of the aggregation of multiple points. Rather, the total power flow at the single point of the aggregation of multiple points is estimated, with such estimation optionally utilizing one or more real measurements that are not at the single point of the aggregation of multiple points.

As one example, many branches or sections of a distribution feeder do not have actual power measurements available. In this case, an estimate of the power flow can be used instead of measurements from an actual meter at a POI. These locations in the grid, where power measurements are not available, can be critical control points for managing power constraints and for achieving the overall supply and demand balance of the system. In view of these and other considerations, implementations disclosed herein operate such locations as Virtual Microgrids (VMGs). Accordingly, a VMG can include a node or vPOI in the grid where all power flows, to loads and connected DER behind this vPOT, will be managed. A VMG can have the same or similar properties as conventional microgrids and can provide the means to control the flow at designated point(s). A VMG can control the setpoints of real microgrid(s) and/or can control discrete controllable resource(s) behind the vPOI.

This VMG approach provides the means to dramatically increase power grid control and resilience without costly upgrades of power measurements in existing distribution networks. For example, it enables managing power at a POI without necessitating installation of any utility grade meter at the POI. It also accelerates the achievement of 100 percent renewables by organizing and managing higher penetration of DER in existing distribution systems and/or enables quick adaptation to topological changes to the power grid. This approach allows not only specified flow at selected points in the distribution grid but also allows the control system to dampen grid oscillations by tuning the virtual controllers to respond in real-time to unwanted power oscillations. This can improve the power quality at these locations. Such control can also be used to maintain specified flows at these virtual points to achieve additional or alternative objectives such as voltage or power flows specified according to system requirements to meet service quality standards and/or to provide real-time participation and power flow management to enable energy markets.

In some implementations, a potential VMG, in the power network, with a single point or an aggregation of multiple points of power flow, can be located by tracing the graph structure of the power network. The graph structure includes branches (edges) through which all power flows, to loads toward the leaf nodes in the network, pass. Graph theory functions are available, in software libraries, that enable rapid (and optionally automatic) tracing of the paths through a graph structure of a power network to identify the location of potential vPOIs. One non-limiting example of such a software library is the Boost Graph Library. Similar functions are available in applications that use the traditional Admittance matrix representation of the electric power network. It is noted that, when using the graph theory approach, the impedances of the branches are not necessary. The same is true of the Admittance approach if it is written as a connection matrix rather than an admittance matrix.

This expanded VMG approach provides system security from the bottom-up of the grid and provides building blocks to achieve desired overall grid performance. This contrasts with the conventional method of top-down control from the central generation and transmission side of the grid. This expanded VMG approach enables the flow at these points to be controlled by manipulating loads and DER behind the connection point. Controllable resources, such as controllable loads and DER are now common in distribution systems. Such controllable loads and DER can include, for example, electric vehicle charging systems, battery systems, solar PV arrays, real microgrids, and/or other component(s). Control of power systems requires two basic elements: (1) setpoints for both real power flow and reactive power flows at the POI (or voltage magnitude and angle may be used instead of real and reactive power) and (2) measurements of the real and reactive power flow at the POI (or measurements of the voltage magnitude and angle at the POI). The pair of real and reactive power at the POI is referred to as "apparent power" that includes both real power and reactive power. This is a complex number defined by the letter (S) where $S=P+jQ$, where P is real power (Watts), and Q is reactive power (VARs).

The measurements at the POI can be actual values from "real microgrids" that control distributed energy resources (DER) and controllable loads behind the POI and/or can be estimated values from VMGs. The estimated values from VMGs can be from estimated measurements that can be obtained utilizing a network model and/or from other measured data to estimate values at the POI. When there is no actual power measurement at the POI, it is defined as a vPOI. These are nodes in the network graph of the distribution system, where the graph includes nodes and branches, and the associated microgrid just behind the vPOI is defined as a VMG. The estimated measurement at the vPOI is compared with the desired power flow setpoint to determine the control action required to drive the virtual measurement value to the setpoint. This can be achieved, for example, by a two-input two-output microgrid controller that ensures zero error between the measurement and the setpoint. Such a controller can be an integral action feedback controller that includes "integral" action, a distinctly different approach than conventional "droop" control. As a comparison, conventional droop control is proportional error only and the steady state value of the measurement will not equal the setpoint. One example is frequency droop control. With frequency droop control, the steady state closed loop gain of a droop controller with zero error dead band is $1/(1+K_p)$, where $K_p$ is the proportional gain. If there is a dead band, the steady state will be at either the high or low dead band values. Hence, the need for integral action to robustly achieve zero steady state error. Additional terms in the controller can be included, such as derivative and feed forward action.

The two inputs to the two-input two-output microgrid controller can be the real and reactive power measured and/or estimated at the vPOI. The two outputs to the two-input two-output microgrid controller can include the real and reactive power dispatch signals to traditional generators and grid-following inverters and/or the voltage and frequency dispatch signals to inverters in grid-forming mode. In the case where the VMG is supervising a real microgrid POI in a multi-level control arrangement (i.e., the real microgrid POI is topologically behind the vPOI of the VMG), the real and reactive power commands can be sent to the real and reactive setpoints of the real microgrid controller. This is commonly referred to as cascade or hierarchical control.

The power flows at the point of interconnection (both POI and vPOI) directly affect the behavior of the grid and can be used to control both the grid stability and other properties of the grid such as voltage and branch flows (thermal limits), whereas power flows of the DERs behind the POI do not directly affect the grid. The VMG control systems can directly regulate certain forced oscillations from large generators and/or oscillations from the resonant frequency of the network itself (RLC circuit resonance). These can be controlled by rapidly adjusting the setpoints of the VMGs. With the individual loads or sources behind the vPOI, the virtual microgrid controller adjusts behind the meter (i.e., topologically behind the POI) loads and/or generation and energy storage to manage the apparent power flow at the vPOI. The virtual microgrid controller can be tuned to "cutoff" all frequencies above a specified value. For example, the virtual microgrid controller can be tuned to cutoff all frequencies above 11 Hz, which is an example natural resonant frequency of one grid in Virginia that has a large quantity of EV and PV systems. This can require a controller that uses data at sampling intervals at least twice as fast as the highest cutoff frequency desired. For example, the controller must operate at 22 Hz or faster when the natural resonant frequency is 11 Hz. The controller can be continually tuned to accommodate changes in the oscillation frequency. For example, the natural resonant frequency of a grid can be at least selectively determined to monitor for changes thereto, and the controller can be tuned to operate at a rate that is at least twice that of a most recently determined natural resonant frequency. More generally, the grid can be at least selectively analyzed to determine a natural resonant frequency and/or other property thereof, and the operation of the controller can be automatically adapted to the determined property/properties of the grid.

A vPOI can include, for example, physical metering points downstream, such as a residential or commercial meter, aggregated advanced metering infrastructure (AMI) data at a transformer, or isolation devices with integrated measurements at certain branches in a feeder circuit. For example, a graph representation of the distribution network can be used to find potential vPOIs. The ability to control such an expanded concept of a POI can be implemented by controlling the subset of DERs and controllable loads behind a vPOI, including any real microgrids behind this node and/or any additional virtual microgrid(s) behind this node.

Estimated values of the flows at the vPOI can also be used in the virtual microgrid controllers, instead of or in addition to actual measured values. In some of these cases, estimated values of real and reactive power and/or estimated voltage and voltage angle can be estimated using state estimators. For example, linear state estimators can be used, which are often used in conjunction with phasor measurement unit (PMU) measurements. As another example, an effective method of estimating the state of unmeasured node(s) in the grid is combining the non-linear power flow model with the available measured values in the form of an observer. One such approach is called a Luenberger observer. A Luenberger observer provides an optimal estimate of the state of the power network at every node using only relevant available actual measurement(s) (e.g., PMU measurement(s) and/or other measurement(s)). From these estimates, the branch flows that become the vPOI can be computed. This approach can also be referred to as virtual telemetry.

A virtual microgrid controller can be implemented in remotely located computing device(s) (e.g., in one or more server(s) in one or more cluster(s) in the "cloud"), and the virtual microgrid controller can be implemented without the use of any physical microgrid controller on-premises. In various implementations, with a VMG only two components are required to achieve a setpoint value at a vPOI: (1) an estimate of power measurement at the vPOI and (2) control authority over one or more controllable resources that are topologically behind the vPOI.

Turning now to the Figures, FIG. 1A schematically depicts an example virtual microgrid (VMG) 110A and example virtual microgrid controller (VMC) 120. The VMG 110A is a subset of a larger grid 100 and includes a vPOI 111A. Various electrical resources are located topologically behind the vPOI 111A, including one or more controllable generators 112A, one or more controllable batteries 114A, one or more controllable loads 116A, one or more real microgrids 118A, and one or more uncontrollable loads 119A. Other VMGs can have more or fewer electrical resources and/or more or fewer electrical resource types. For example, some VMGs can lack any controllable generator(s) and/or can lack any controllable real microgrid(s) that are topologically behind a corresponding vPOI.

Some of the electrical resources of the VMG 110A are uncontrolled and un-measured and others are controllable and measured. For example, uncontrollable load(s) 119A are uncontrolled and unmeasured and can include light switches, certain appliance(s), etc. The controllable load(s) 116A are automatically controllable and one or more can optionally be measured. For example, the controllable load(s) 116A can an EV charging system, a thermostat, and/or other controllable load(s). The controllable battery/batteries 114A are controllable and optionally measured, and can selectively both pull power from the grid 100 and provide power to the grid 100 (as indicated by the double ended arrow). The controllable generator(s) 112A are controllable and measured, and can at least selectively provide power to the grid 100. Whether and/or how the controllable generator(s) 112A provide power to the grid 100 can be controlled. The real microgrid(s) 118A can be controlled and measured, and each can include corresponding electrical resource(s) that are topologically behind the corresponding real microgrid 118A. A real microgrid can pull power from the grid 100 and can optionally (depending on its corresponding electrical resource(s)) provide power to the grid 100.

The VMC 120 can be implemented via software that is executing in computing device(s) that are remote from the grid 100, such as in server(s) in the cloud. Despite being remote from the grid 100, the VMC 120 is in network communication with controllable and/or measured resource(s) of the VMG 110A. Such network communication can enable the VMC 120 to obtain real measurement(s), if any, from measured resource(s) of the VMG 110A and/or can enable the VMC 120 to selectively control controllable resource(s) of the VMG 110A to achieve desired power flow setpoints (e.g., via transmission of control actions). The network communication can be, for example, via power line communications and/or via separate communication channel(s) such as a separate local area network (LAN) and/or wide area network (WAN) (e.g., the Internet).

The VMC 120 is illustrated as including three components: an estimated measurements module 122, a proportional integral (PI) controller 124, and a splitter 126, each of which can be implemented via corresponding portions of software. The VMC 120 can include more or fewer logical software components in other implementations.

The estimated measurements module 122 iteratively generates estimated measurements 123 of current (e.g., real-time) power flow at the vPOI 111A. Each of the estimated measurements 123 can include, for example, either an estimated real power flow and estimated reactive power flow pair or an estimated voltage magnitude and estimated voltage angle pair. Each of the estimated measurements 123 can optionally be based on one or more real measurement(s) 102 and/or other data 101.

The estimated measurements 123 are estimated as they are not based on any actual measurements of current power flow at the vPOI 111A, as there is no real physical measuring device, for power flow, that is available at a physical location corresponding to the vPOI 111A. In generating the estimated measurements 123, the estimated measurements module 122 can use a network model and one or more state estimators. For example, the estimated measurements module 122 can use a non-linear power flow model and a state estimator in the form of an observer, such as a Luenberger observer. For instance, in generating estimated measurements of current power flow, the estimated measurements module 122 can utilize a non-linear power flow model and a state estimator, along with one or more current real measurements 102 and/or other data 101. The current real measurement(s) 102 can be recent or temporally synchronized measurement(s) from one or more of the measured electrical resource(s) that are topologically behind the vPOI 111A. For instance, the current real measurement(s) 102 can include time synchronized measurements from controllable generator(s) 112A and controllable load(s) 116A. The other data 101 can include, for example, historical power flows related to the vPOI 111A, current weather data, and/or other type(s) or source(s) of data.

The estimated measurements 123 are provided to the PI controller 124, along with setpoints 103 for current power flow at the vPOI 111A. Each of the setpoints 103 can include, for example, either a current power flow and current reactive power flow pair or a current voltage magnitude and current voltage angle pair. The setpoints 103 can be, for example, received from a higher-level controller and can be determined by the higher-level controller to ensure reliability of the grid 100 and/or to achieve additional or alternative benefit(s). For example, the higher-level controller can provide a new sequence of setpoints 103 daily or at other regular or non-regular interval. In some implementations, the setpoints can be sent at high rates, such as at or above 60 Hz, to dampen the oscillations in the power grid. For example, when new setpoints are sent at 60 Hz, a new setpoint can be used by the PI controller 124 every $1/60^{th}$ of a second. The higher-level controller can determine the sequence of setpoints 103 in coordination with determining sequences of setpoints provided to other VMG(s) and/or real microgrid(s) of the grid 100. For example, the higher-level controller can determine setpoints for all VMG(s) and real microgrid(s), in combination, to ensure reliability of the grid 100 and/or to achieve certain desired properties for the grid 100 overall.

The PI controller 124 processes the setpoints 103 and the estimated measurements 123 to generate control output 125 that directly or indirectly indicates control (if any), of controllable resource(s) topologically behind the vPOI 111A, that is needed to achieve the current setpoints 103. Put another way, the PI controller generates the control output 125 in view of the current setpoints 103 and the current estimated measurements 123, and generates the control output 125 such that the control action(s), reflected by the control output 125, when implemented, will reduce (or eliminate) any difference between the current setpoints 103 and the current estimated measurements 123. As one example, the control output 125 can reflect a real power adjustment and/or a reactive power adjustment that is to be made. The PI controller 124 can include integral action to assure there is zero steady state error.

The control output 125 is provided to splitter 126, which can allocate the control output 125 among one or more controllable resource(s) that are topologically behind the vPOI 111A. In doing so, the splitter 126 can consider the parameters of the control output 125 (e.g., is it calling for an increase or a decrease and/or extent of increase/decrease), controllable resource(s) that are included in the VMG 110A, status of those controllable resource(s) (e.g., is a controllable generator already on and/or already at max power; is a controllable load already off, etc.), and/or other factor(s). For example, as illustrated in FIG. 1A the splitter 126 allocates the control output 125 to four different control actions: G, B, CL, and M. Control action G is for controllable generator(s) 112A and can be transmitted thereto to cause corresponding control. Control action B is for controllable battery/batteries 114A and can be transmitted thereto to cause corresponding control. Control action CL is for controllable load(s) 116A and can be transmitted thereto to cause corresponding control. Control action M is for controllable microgrid(s) 118A and can be transmitted thereto to cause corresponding control. Transmitting of corresponding control actions can optionally be by direct data communication to the devices, such as that which uses the IEEE 2030.5 protocol over Internet or the new IEEE P2664 protocol.

As a particular example, the control action G and/or the control action B (e.g., when 114A is associated with a grid-following inverter) can include a real and reactive power dispatch signal. As another particular example, the control action CL can include a command to switch on or switch off controllable pool heater(s), controllable charging station(s), and/or to adjust temperature(s) of thermostat(s). As yet another particular example, the control action M can include a real and reactive power dispatch signal to be handled by a corresponding real microgrid as it sees fit. Although FIG. 1A illustrates the control output 125 being split into four separate control actions, some control outputs can be split into more or fewer control actions, or not at all (i.e., the control output effectuated via a single controllable resource).

Figure 1B:
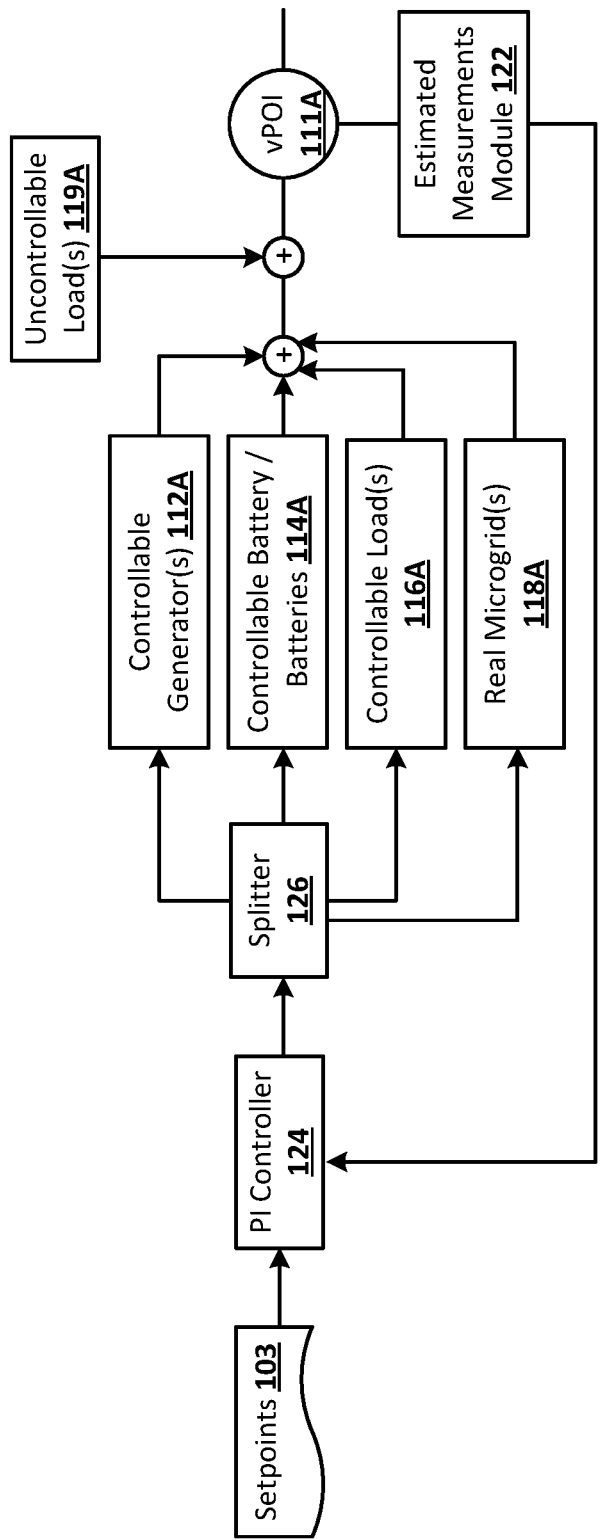
FIG. 1B schematically depicts an example feedback control loop that involves the example virtual microgrid and example virtual microgrid controller of FIG. 1A.

Turning now to FIG. 1B, an example feedback control loop is illustrated that involves the example VMG 110A and example VMC 120 of FIG. 1A. In FIG. 1B, the estimated measurements module 122 generates estimated power flow measurements, for the vPOI 111A, and feeds the estimated power flow measurements to the PI controller 124. In generating the estimated power flow measurements, the estimated measurements module 122 can utilize a network model and optionally measured values from electrical resource(s) 112A, 114A, 116A, and/or 118A. However, notably, the estimated measurements module 122 generates the estimated power flow measurements without utilizing any actual measurement of the power flow at the vPOI 111A and, optionally, without utilizing corresponding real measurements for all of the electrical resources topologically behind the vPOI 111A. For example, the estimated measurements module 122 can generate the estimated power flow measurements utilizing a network model, real measurements for only a subset of the electrical resources topologically behind the vPOI 111A, and without utilizing any actual measurement of the vPOI 111A.

The PI controller 124 processes the estimated power flow measurements, and the current power flow setpoints 103, to generate control output that is provided to splitter 126. Splitter 126 allocates the control output to more granular control actions for electrical resources 112A, 114A, 116A, and 118A. Those control actions are transmitted to electrical resources 112A, 114A, 116A, and 118A to effectuate corresponding changes at the electrical resources 112A, 114A, 116A, and 118A. The process is then repeated, with estimated measurements module 122 generating new estimated power flow measurements after transmission of the control actions. The process can be performed iteratively and at a relatively high rate to enable real-time achievement of a deterministic flow of power at the vPOI 111A.

As described herein, a large quantity of VMGs and associated VMCs can be implemented across a power network. In some implementations, each of the VMCs can be setup with the same format and each can be run from a corresponding instance of one executable program, but with a set of different parameters that are specific to the corresponding VMG. For example, a template can be utilized to define parameters for a VMG and the template, with the defined parameters, can be used to execute a VMC for the VMG. Some of the defined parameters can be static over time, while others can be dynamically updated based on dynamically changing data.

As a particular example, a template can define: a dynamic operating envelope (DOE), DER(s), controllable load(s), a point of interest, and/or market consideration(s). For example, the DOE of a template can be used to define real power flow set point(s) (e.g., an array of real power setpoint limits for 24 hours) and reactive power flow set point(s) (e.g., an array of reactive power setpoint limits for 24 hours). Also, for example, the DER(s) of a template can be used to define, for each DER behind the vPOI, parameter(s) such as static specification(s), a real power setpoint, a real power actual, a reactive power setpoint, a reactive power actual, and/or an energy profile (e.g., an array of power setpoints for 24 hours). Also, for example, controllable load(s) of a template can be used to define, for each controllable load behind the vPOI, a type (e.g., AC, HWH, Dryer, Pool Pump, etc.), a communications channel and frequency, and/or control logic timing. Also, for example, a point of interest of a template can be used to define a real power setpoint, a real power actual, a reactive power setpoint, a reactive power actual, a meter ID, a latitude, a longitude, an elevation, a distribution transformer, a branch number, a feeder number, and LV substation, and/or an MV substation. Also, for example, market consideration(s) of a template can be used to define energy bids/offers and/or acknowledgement(s).

A non-limiting example control algorithm associated with such a VMG template is u=Kp*e+Ki*∫e*dt+Kd*ṁ, where Kp is there proportional gain, Ki is the integral gain and Kd is the filtered derivative of the measured value. For example, such a control algorithm can be used, by a VMC, to control a corresponding VMG in accordance with a template for the VMG.

Figure 2:
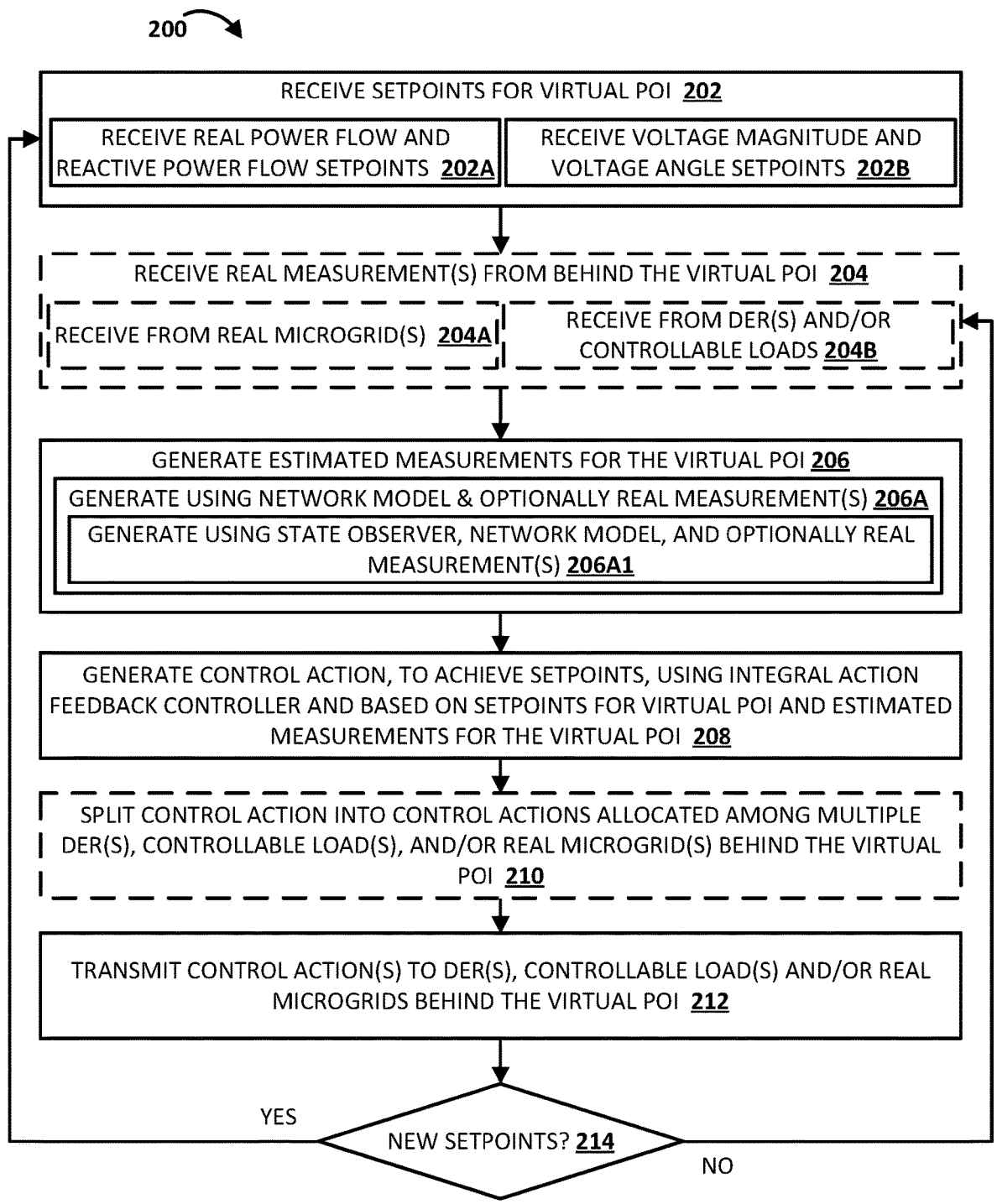
FIG. 2 illustrates an example method of controlling the power flow of energy resources, behind a virtual point of interconnection and within a virtual microgrid, to achieve desired setpoints for the power flow.

FIG. 2 is a flowchart illustrating an example method 200 of controlling the power flow of energy resources, behind a virtual point of interconnection and within a virtual microgrid, to achieve desired setpoints for the power flow. For convenience, the operations of the flow chart are described with reference to a system that performs the operations. This system can include various components of various computer systems, such as one or more components of server computing device(s). Moreover, while operations of method 200 are shown in a particular order, this is not meant to be limiting. One or more operations can be reordered, omitted or added.

At block 202, the system receives setpoints for a vPOI. Block 202 can optionally include sub-block 202A or sub-block 202B. At sub-block 202A, the received setpoints include real power flow setpoints and a reactive power flow setpoint pair. At sub-block 202B, the received setpoints include a voltage magnitude setpoint and voltage angle setpoint pair.

At optional block 204, the system receives real measurement(s) from measured resource(s) from behind the vPOI. Optional block 204 can optionally include sub-block 204A and/or sub-block 204B. At sub-block 204A, the system receives real measurement(s) from real microgrid(s) that are topologically behind the vPOI. At sub-block 202B, the system receives real measurement(s) from DER(s) and/or controllable load(s) that are topologically behind the vPOI.

At block 206, the system generates estimated measurements for the vPOI. For example, the system can generate an estimated real power flow and an estimated reactive power flow pair or can generate an estimated voltage magnitude and estimated voltage angle pair. At block 206, the estimated power flow measurements can be generated without utilizing any actual measurement of the power flow at the vPOI and, optionally, without utilizing corresponding real measurements for all of the electrical resources topologically behind the vPOI.

Block 206 can optionally include sub-block 206A, which can optionally include further sub-block 206A1. At sub-block 206A, the system generates the estimated measurements using a network model (e.g., network flow model) and optionally real measurements (e.g., any real measurements received at optional block 204, if performed). At optional further sub-block 206A1, the system generates the estimated measurements using a state observer, the network model, and optionally real measurements.

At block 208, the system generates a control action to achieve the setpoints of a most recent iteration of block 202. The system generates the control action using an integral action feedback controller and generates the control action based on setpoints for the vPOI (the setpoints of a most recent iteration of block 202) and estimated measurements for the vPOI (the estimated measurements of a most recent iteration of block 206).

At optional block 210, the system splits the control action, of a most recent iteration of block 208, into individual control actions allocated among multiple controllable resource(s) that are topologically behind the vPOI. Such controllable resource(s) can include DER(s), controllable load(s), and/or real microgrid(s).

At block 212, the system transmits the control action(s) (of block 208 or block 210) to controllable resource(s) that are topologically behind the vPOI. Such controllable resource(s) can include DER(s), controllable load(s), and/or real microgrid(s).

The system determines, at block 214, whether new setpoints should be utilized. For example, the system can determine to use new setpoints if new setpoints have been received from a higher-level controller or if a schedule, for an array of previously received setpoints, indicates a new setpoint should now become active.

If the decision at block 214 is that new setpoints should be utilized, the system proceeds back to block 202 and receives the new setpoints (e.g., from a higher-level controller or from memory). If not, the system proceeds back to block 204 utilizing the setpoints of a most recent iteration of block 202.

The method 200 can be performed iteratively in controlling a given VMG. In some implementations, the method 200 can be performed at a rate that is tuned to cutoff all frequencies that are above a specified value (e.g., 1.5 Hz or other value). Moreover, multiple instances of the method 200 can be performed in parallel, each being for controlling a different corresponding VMG.

It is noted that, in some iterations of method 200 the setpoints received at block 202 can be zero. Those iterations will cause virtual islanding of the electrical resources that are topologically behind the vPOI. Put another way, when the setpoints are zero, control action(s) that are generated at block 208 and/or 210 will, when transmitted in block 212 and implemented, will cause the actual power flow at the vPOI to be maintained at zero—thereby creating a virtual island for the electrical resources that are topologically behind the vPOI Turning now to FIGS. 3A-5, some implementations of automatically determining a VMG are described.

Figure 3A:
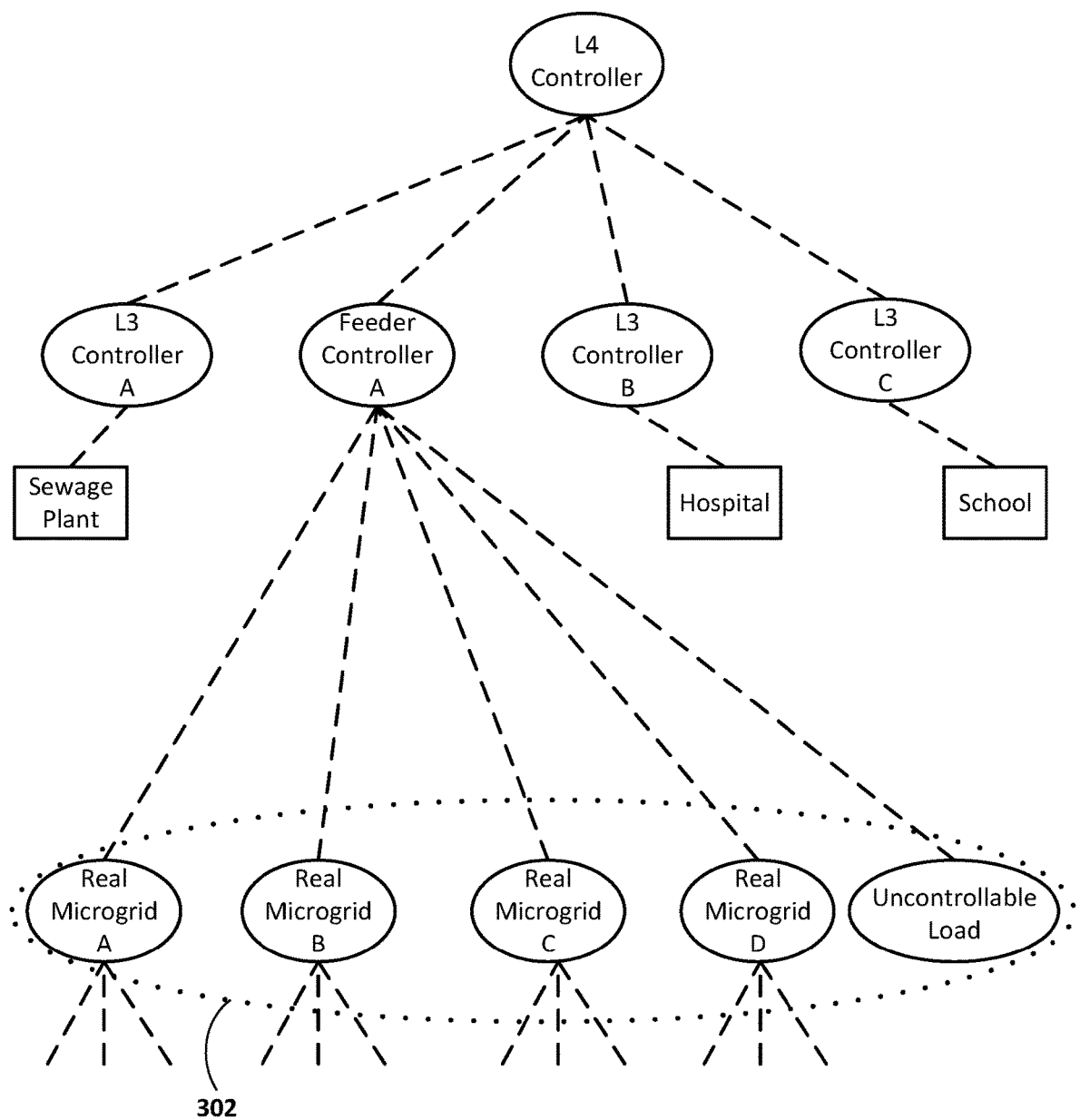
FIG. 3A illustrates a portion of a graph of a power network.

FIG. 3A illustrates a portion 300 of a graph of a power network, and a branch of the portion 300 that connects five nodes 302. Of the nodes 302, four are corresponding real microgrids and one is an uncontrollable load. It is noted that the four real microgrids can each include electrical resources located topologically behind the real microgrid, as indicated by the three dashed lines extending from each. The nodes 302 can be determined (e.g., based on a trace of the power network) based on them each being connected, via a corresponding branch (represented by dashed lines), to a "Feeder Controller A" node. Other nodes of the portion 300 of the graph are illustrated in FIG. 3 for context (e.g., L3 Controllers A-C, L4 Controller).

Figure 3B:
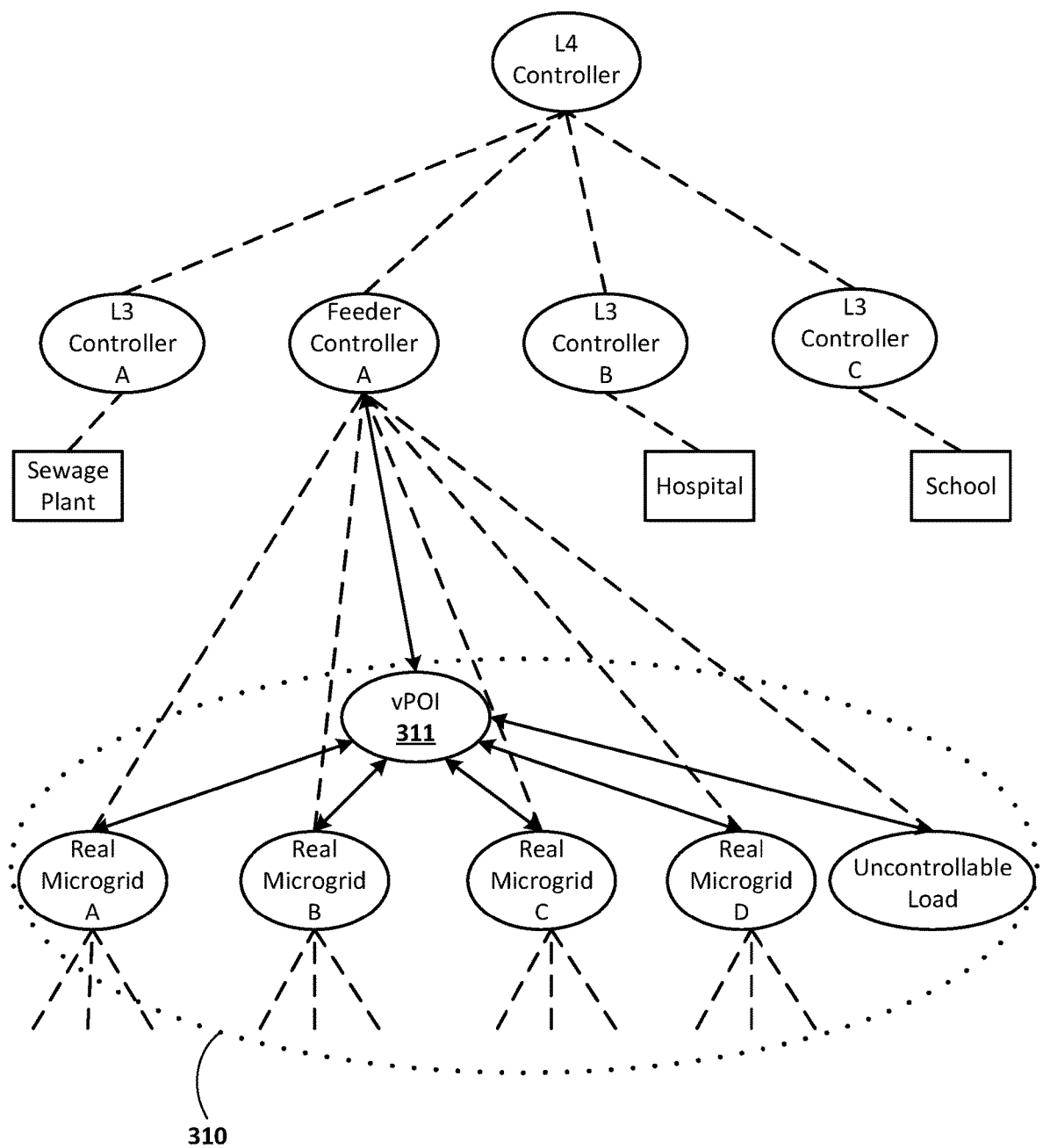
FIG. 3B illustrates a virtual microgrid that can be defined based on the portion of the graph of the power network of FIG. 3A.

FIG. 3B illustrates a VMG 310 that can be defined based on the determined nodes 302 of FIG. 3A. The VMG 310 includes a vPOI 311 at the branch intersection for the nodes 302 and includes the nodes 302, including the four real microgrid nodes and the one uncontrollable load node. Solid lines, between the vPOI 311, and the four real microgrid nodes, the uncontrollable load node, and the Feeder Controller A node, represent the topology for the VMG 310. It is noted that, even though no actual power flow measurements are available at a location corresponding to the vPOI 311, estimated power flow measurements can be generated according to techniques described herein. Further, power flow at the location of the vPOI 311 can be controlled based on processing such estimated power flow measurements and power flow setpoints, using a feedback controller, to generate control output(s) to provide to the real microgrid node(s). For example, the Feeder Controller A node can communicate setpoints to the vPOI 311. As another example, the vPOI 311 can receive measurement(s) from the Real Microgrid A node and/or provide control outputs to the Microgrid A node.

Figure 4A:
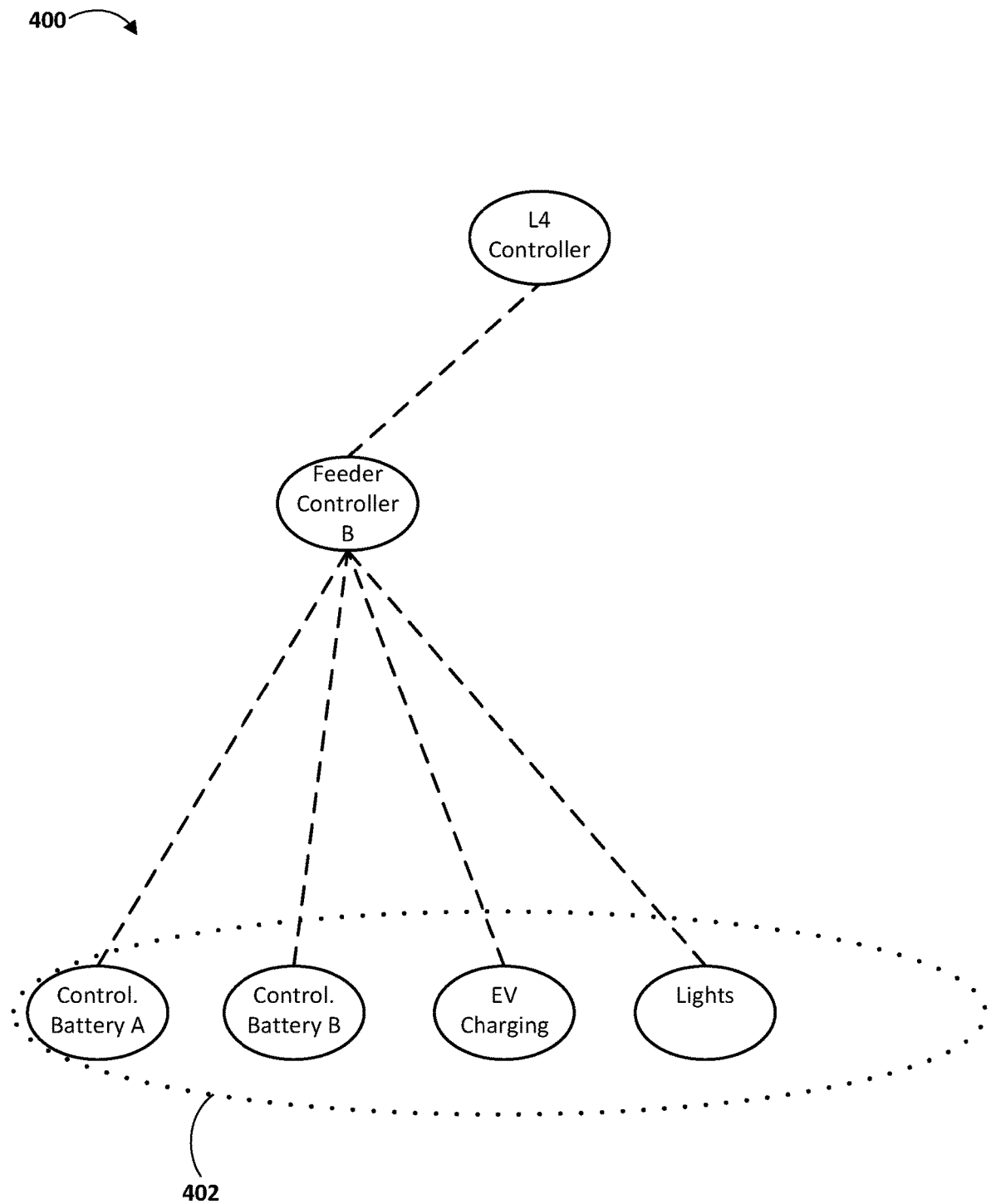
FIG. 4A illustrates an additional portion of the graph of the power network.

FIG. 4A illustrates an additional portion 400 of the graph of the power network, and a branch of the additional portion 400 that connects four additional nodes 402. The additional nodes 402 include: a Control Battery A node, a Control Battery B node, an EV Charging node, and a Lights node. The nodes 402 can be determined based on the nodes thereof each being connected, via a corresponding branch (represented by dashed lines), to a "Feeder Controller B" node. L4 controller, of the portion 400 of the graph, is illustrated in FIG. 4 for context.

Figure 4B:
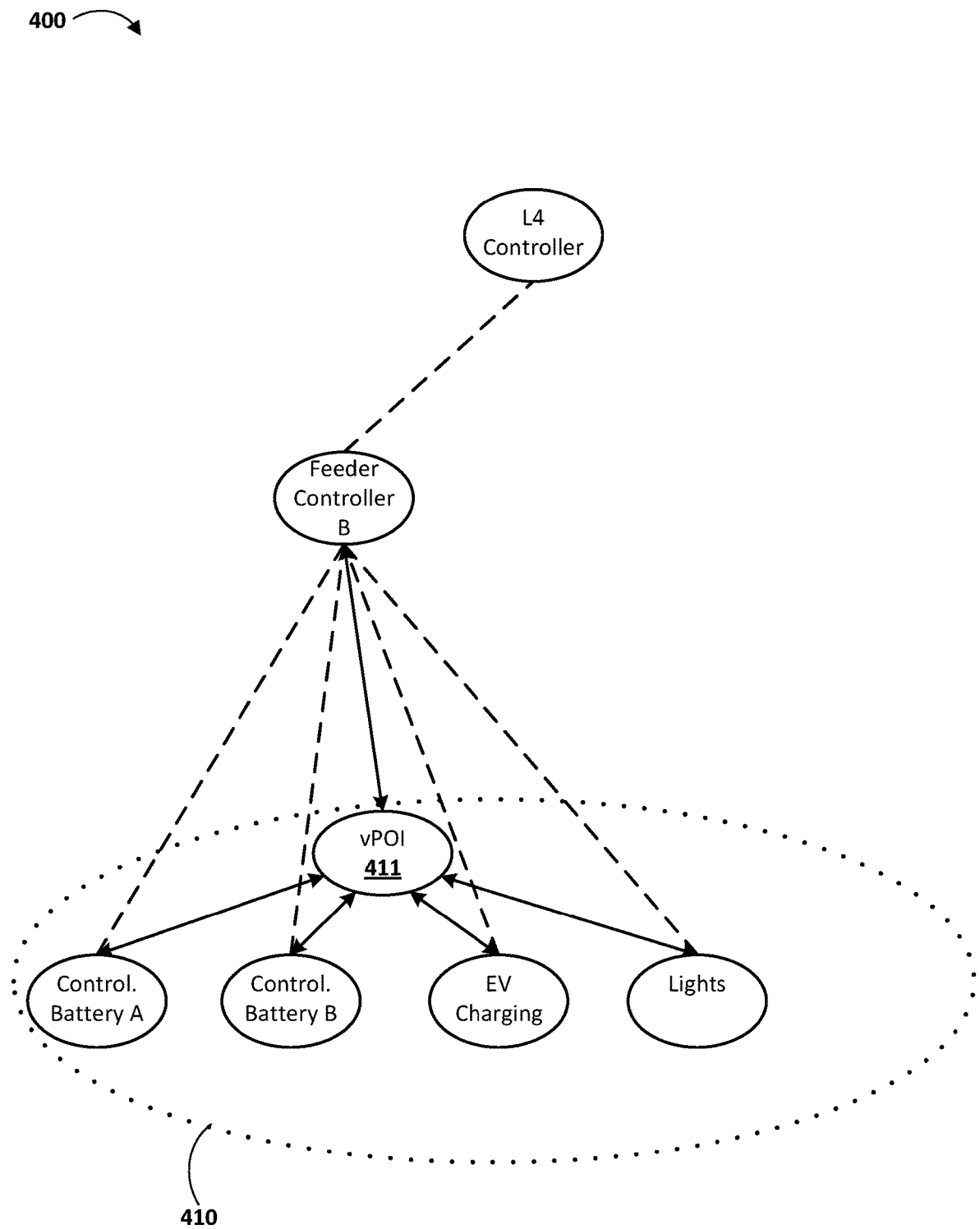
FIG. 4B illustrates a virtual microgrid that can be defined based on the additional portion of the graph of the power network of FIG. 4A.

FIG. 4B illustrates a virtual microgrid 410 that can be defined based on the determined additional nodes 402 of FIG. 4A. The VMG 410 includes a vPOI 411 at the branch intersection for the additional nodes 402 and includes the additional nodes 402, including the Control Battery A node, the Control Battery B node, the EV Charging node, and the Lights node. Solid lines, between the vPOI 411, and the respective nodes, represent the topology for the VMG 410. It is noted that, even though no actual power flow measurements are available at a location corresponding to the vPOI 411, estimated power flow measurements can be generated according to techniques described herein. Further, power flow at the location of the vPOI 411 can be controlled based on processing such estimated power flow measurements and power flow setpoints, using a feedback controller, to generate control output(s) to provide to the Control Battery A and/or B nodes and/or the EV Charging node. For example, the Feeder Controller B node can communicate setpoints to the vPOI 411. As another example, the vPOI 411 can receive measurement(s) from the Control Battery A and B nodes and/or provide control outputs to the EV charging node.

Figure 5:
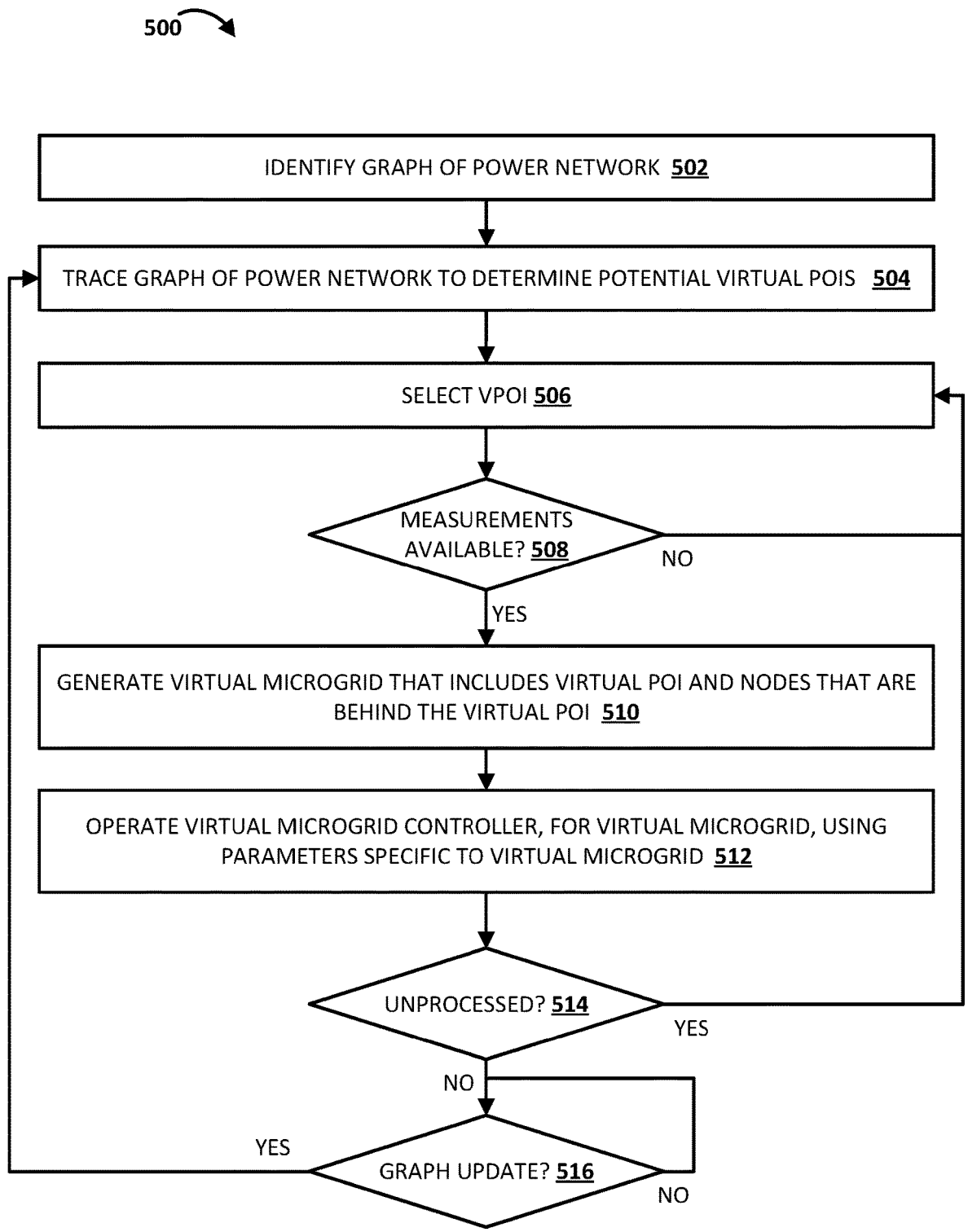
FIG. 5 illustrates an example method of generating virtual microgrids based on a graph of a power network, and operating a corresponding virtual microgrid controller, for each of the virtual microgrids, using parameters that are specific to the virtual microgrid.

FIG. 5 is a flowchart illustrating an example method 500 of generating virtual microgrids based on a graph of a power network, and operating a corresponding virtual microgrid controller, for each of the virtual microgrids, using parameters that are specific to the virtual microgrid. For convenience, the operations of the flow chart are described with reference to a system that performs the operations. This system can include various components of various computer systems, such as one or more components of server computing device(s). Moreover, while operations of method 200 are shown in a particular order, this is not meant to be limiting. One or more operations can be reordered, omitted, or added.

At block 502, the system identifies a graph of a power network. The graph of the power network can be one generated utilizing various techniques, such as utilizing existing modeling of portions of the power network, automatic discovery of some or all nodes of the power network, and/or other techniques. The generated graph can include branches (edges) through which power flows, to loads toward the leaf nodes in the network, pass.

At block 504, the system traces the graph of the power network to determine potential vPOIs in the power network. The nodes that are connected by the branches can each represent a graphed electrical resource.

At block 506, the system selects one of the vPOIs determined at block 504.

At block 508, the system determines whether estimated power flow measurements are available for the selected vPOI. For example, the system can determine whether any of the graphed electrical resources, represented by nodes of the vPOI, are measured resources that can generate real measurements. If so, the system can determine that estimated power flow measurements are available for the selected vPOI.

If the decision at block 508 is no, the system can return to block 506 and select another vPOI. If the decision at block 508 is yes, the system can proceed to block 510.

At block 510, the system generates a virtual microgrid that includes a vPOI and that includes the nodes that are topologically behind the vPOI. Put another way, the vPOI will be topologically in front of the nodes.

At block 512, the system operates a VMC, for the VMG generated at block 510, using parameters that are specific to the VMG. For example, the system can operate the VMC based on method 200 of FIG. 2 and/or using the template approach described herein. The parameters that are specific to the VMG can include, for example, parameters for the vPOI (e.g., location), parameters for the electrical resource(s) that are topologically behind the vPOI (e.g., whether it is a DER, a controllable resource, a generator, etc.), and/or other parameter(s).

At block 514, the system determines whether there are any unprocessed vPOIs. If so, the system proceeds back to block 506 and selects another vPOI. If not, the system can proceed to block 516.

At block 516, the system determines whether there has been a graph update. A graph update can occur due to various factors. Such factors include temporary or permanent islanding of portion(s) of a grid, a blackout of a portion of the grid, removal of infrastructure from the grid, and/or addition of infrastructure to the grid.

If, at an iteration of block 516, the system determines there has been a graph update, the system can proceed back to block 504 and operate on the updated graph. This can result in defining new VMG(s) and/or removing existing VMG(s) to accommodate the updated graph. Accordingly, implementations can robustly and dynamically adapt VMGs to be responsive to temporary or permanent graph updates, thereby ensuring system stability across various scenarios.

Figure 6:
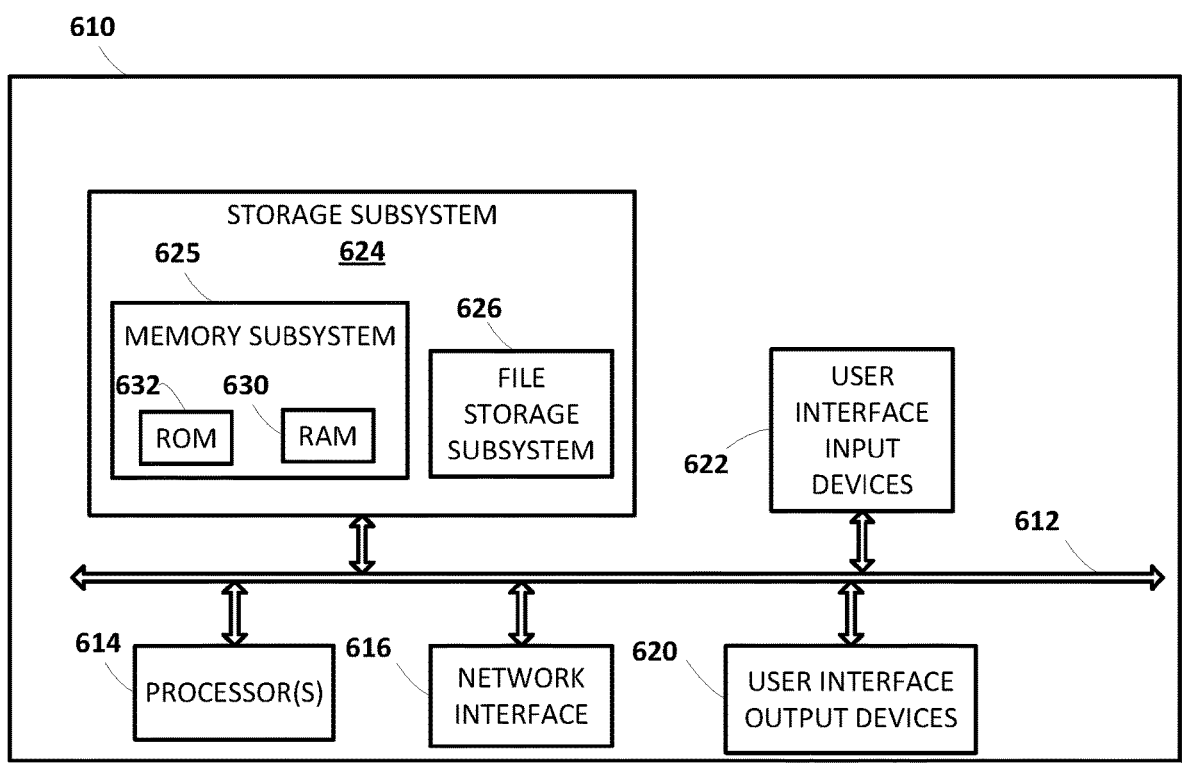
FIG. 6 schematically illustrates an example computer architecture on which selected aspects of the present disclosure can be implemented.

FIG. 6 is a block diagram of an example computing device 610 that can optionally be utilized to perform one or more aspects of techniques described herein. For example, all or aspects of computing device 610 can be incorporated in server(s) or other computing device(s) that are utilized to implement a virtual microgrid controller.

Computing device 610 typically includes at least one processor 614 which communicates with a number of peripheral devices via bus subsystem 612. These peripheral devices can include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 can include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 can include the logic to perform selected aspects of the methods of FIGS. 2 and/or 5, as well as to implement various components depicted in the Figures.

These software modules are generally executed by processor 614 alone or in combination with other processors. Memory 625 used in the storage subsystem 624 can include a number of memories including a main random-access memory (RAM) 630 for storage of instructions and data during program execution and a read only memory (ROM) 632 in which fixed instructions are stored. A file storage subsystem 626 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem can use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein can be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations can be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by processor(s) is provided and includes identifying current power flow setpoints for a virtual point of interconnection (vPOI) for a virtual microgrid. The virtual microgrid includes the vPOI and a plurality of electrical resources that are topologically behind the vPOI. The plurality of electrical resources include one or more automatically controllable resources. The method further includes generating current estimated power flow measurements for the vPOI. Generating the current estimated power flow measurements can include using a network model to estimate the current estimated power flow measurements. Generating the current estimated power flow measurements can be independent of any actual measurement of the power flow at the vPOI and/or can be independent of any corresponding real measurements for all of the electrical resources that are topologically behind the vPOI. The method further includes generating, based on processing the current power flow setpoints and the current estimated power flow measurements using an integral action feedback controller, one or more control actions to achieve the current power flow setpoints. Each of the control actions is for a respective one of the automatically controllable resources. The method further includes causing the one or more control actions to be transmitted to one or more of the automatically controllable resources that are topologically behind the vPOI.

These and other implementations of the technology disclosed herein can include one or more of the following features.

In some implementations, generating the current estimated power flow measurements includes using state estimation and using certain real measurements for only a subset of the electrical resources that are topologically behind the vPOI. In some versions of those implementations, generating the current estimated power flow measurements using state estimation includes using one or more non-linear observers where a state variable is used for control. In some of those versions, the one or more non-linear observers include a Luenberger observer.

In some implementations, generating the current estimated power flow measurements includes using certain real measurements for only a subset of the electrical resources that are topologically behind the vPOI. In some of those implementations, generating the current estimated power flow measurements is temporally synchronized with measurement times of the certain real measurements.

In some implementations, the feedback controller is tuned to reduce oscillations, in the grid, that are above a specified cutoff frequency.

In some implementations, the one or more control actions include a real and reactive power dispatch signal. In some of those implementations, the real and reactive power dispatch signal is for a generator of the automatically controllable resources or is for a grid-following inverter of the automatically controllable resources, and causing transmission of the one or more control actions includes causing transmission of the real and reactive power dispatch signal to the generator or to the grid-following inverter.

In some implementations, the method further includes, prior to identifying the current power flow setpoints and generating the current estimated power flow measurements, automatically determining the vPOI and the automatically controllable resources that are topologically behind the vPOI. In some versions of those implementations, automatically determining the vPOI includes determining the vPOI based on determining that it corresponds to a branch intersection in a trace of a graph of a power network. In some of those versions, automatically determining the vPOI includes determining the vPOI further based on determining that one or more real and/or virtual measurements are currently ascertainable for the vPOI.

In some implementations, the current power flow setpoints are zero, thereby creating, through transmitting of the one or more control actions, a virtual island for the electrical resources that are topologically behind the vPOI.

In some implementations, the current power flow setpoints are one of a sequence of power flow setpoints generated by a higher-level controller.

In some implementations, the one or more processors are included in one or more remote server clusters that are in communication with, but separate from, an electrical grid of which the virtual microgrid forms a part.

In some implementations, a given control action, of the control actions, is transmitted via a power line that provides power to one of the automatically controllable resource and/or that receives power from one of the automatically controllable resources.

In some implementations, the one or more control actions include a voltage and frequency dispatch signal for a grid-forming inverter of the automatically controllable resources, and causing transmission of the one or more control actions includes causing transmission of the voltage and frequency dispatch signal to the grid-forming inverter.

In some implementations, the current power flow setpoints include a real power flow setpoint and a reactive power flow setpoint, and the current estimated power flow measurements include an estimated real power flow and an estimated reactive power flow.

In some implementations, the current power flow setpoints include a voltage magnitude setpoint and a voltage angle setpoint, and the current estimated power flow measurements include an estimated voltage magnitude and an estimated voltage angle.

In some implementations, the automatically controllable resources include: a real microgrid, a battery, a generator, a solar array, an electric vehicle charging system, an air conditioning unit, a washer, a dryer, a refrigerator, and/or a pool pump.

In some implementations, a method implemented by processor(s) is provided and includes generating, based on a graph of a power network, a virtual microgrid that includes a virtual point of interconnection (vPOI) and that includes automatically controllable resources based on the automatically controllable resources being topologically behind the vPOI. The method further includes, in response to generating the virtual microgrid, operating a virtual microgrid controller for the virtual microgrid. Operating the virtual microgrid controller can include: processing, using the virtual microgrid controller, power flow setpoints for the vPOI and estimated power flow measurements for the vPOI to generate control actions for achieving the power flow setpoints at the vPOI, and causing transmission of the generated control actions to one or more of the automatically controllable resources to achieve the power flow setpoints at the vPOI.

These and other implementations of the technology disclosed herein can include one or more of the following features.

In some implementations, generating the virtual microgrid is further based on determining that one or more real and/or virtual measurements are currently ascertainable for the vPOI.

In some implementations, generating the virtual microgrid is further based on determining that one or more real and/or virtual measurements are currently ascertainable for the vPOI.

In some implementations, the method further includes generating the estimated power flow measurements using a network model to estimate the current estimated power flow measurements. In some versions of those implementations, generating the estimated power flow measurements is performed without utilizing any actual measurement of the power flow at the vPOI and/or without utilizing corresponding real measurements for all of the electrical resources that are topologically behind the vPOI. In some of those versions, generating the estimated power flow measurements includes using state estimation and using certain real measurements for only a subset of the electrical resources that are topologically behind the vPOI. Optionally, generating the current estimated power flow measurements using state estimation includes using one or more non-linear observers where a state variable is used for control.

In some implementations, the one or more control actions include a real and reactive power dispatch signal.

In some implementations, the one or more control actions include a voltage and frequency dispatch signal for a grid-forming inverter of the automatically controllable resources, and causing transmission of the one or more control actions includes causing transmission of the voltage and frequency dispatch signal to the grid-forming inverter.

In some implementations, the power flow setpoints include a real power flow setpoint and a reactive power flow setpoint, and the estimated power flow measurements include an estimated real power flow and an estimated reactive power flow.

Other implementations can include a non-transitory computer readable storage medium storing instructions executable by one or more processor(s) (e.g., a central processing unit(s) (CPU(s)), graphics processing unit(s) (GPU(s)), and/or tensor processing unit(s) (TPU(s))) to perform a method such as one or more of the methods described herein. Yet other implementations can include a system of one or more computers that include one or more processors operable to execute stored instructions to perform a method such as one or more of the methods described herein.

What is claimed is:

1. A method implemented by one or more processors, the method comprising:
   identifying current power flow setpoints for a virtual point of interconnection (vPOI) for a virtual microgrid, the virtual microgrid including the vPOI and a plurality of electrical resources topologically behind the vPOI, the plurality of electrical resources including one or more automatically controllable resources;
   generating current estimated power flow measurements for the vPOI, generating the current estimated power flow measurements including using a network model to estimate the current estimated power flow measurements and without utilizing corresponding real measurements for all of the electrical resources topologically behind the vPOI;
   generating, based on processing the current power flow setpoints and the current estimated power flow measurements using an integral action feedback controller, one or more control actions to achieve the current power flow setpoints, each of the control actions being for a respective one of the automatically controllable resources; and
   transmitting the one or more control actions to one or more of the automatically controllable resources that are topologically behind the vPOI.

2. The method of claim 1, wherein generating the current estimated power flow measurements comprises using state estimation and using certain real measurements for only a subset of the electrical resources that are topologically behind the vPOI.

3. The method of claim 2, wherein generating the current estimated power flow measurements using state estimation comprises using one or more non-linear observers where a state variable is used for control.

4. The method of claim 3, wherein the one or more non-linear observers include a Luenberger observer.

5. The method of claim 1, wherein generating the current estimated power flow measurements comprises using certain real measurements for only a subset of the electrical resources topologically behind the vPOI.

6. The method of claim 5, wherein generating the current estimated power flow measurements is temporally synchronized with measurement times of the certain real measurements.

7. The method of claim 1, where the feedback controller is tuned to reduce oscillations, in the grid, that are above a specified cutoff frequency.

8. The method of claim 1, wherein the one or more control actions include a real and reactive power dispatch signal.

9. The method of claim 8,
   wherein the real and reactive power dispatch signal is for a generator of the automatically controllable resources or is for a grid-following inverter of the automatically controllable resources, and
   wherein transmitting the one or more control actions includes transmitting the real and reactive power dispatch signal to the generator or to the grid-following inverter.

10. The method of claim 1, further comprising, prior to identifying the current power flow setpoints and generating the current estimated power flow measurements:
   automatically determining the vPOI and the automatically controllable resources that are topologically behind the vPOI.

11. The method of claim 10, wherein automatically determining the vPOI includes determining the vPOI based on determining that it corresponds to a branch intersection in a trace of a graph of a power network.

12. The method of claim 11, wherein automatically determining the vPOI includes determining the vPOI further based on determining that one or more real and/or virtual measurements are currently ascertainable for the vPOI.

13. The method of claim 1, wherein the current power flow setpoints are zero, thereby creating, through transmitting the one or more control actions, a virtual island for the electrical resources topologically behind the vPOI.

14. The method of claim 1, wherein the current power flow setpoints are one of a sequence of power flow setpoints generated by a higher-level controller.

15. The method of claim 1, wherein the one or more processors are included in one or more remote server clusters that are in communication with, but separate from, an electrical grid of which the virtual microgrid forms a part.

16. The method of claim 1, wherein transmitting a given control action, of the control actions, is via a power line that provides power to one of the automatically controllable resource and/or that receives power from one of the automatically controllable resources.

17. The method of claim 1,
   wherein the one or more control actions include a voltage and frequency dispatch signal for a grid-forming inverter of the automatically controllable resources, and
   wherein transmitting the one or more control actions comprises transmitting the voltage and frequency dispatch signal to the grid-forming inverter.

18. The method of claim 1,
   wherein the current power flow setpoints include a real power flow setpoint and a reactive power flow setpoint, and
   wherein the current estimated power flow measurements include an estimated real power flow and an estimated reactive power flow.

19. The method of claim 1,
   wherein the current power flow setpoints include a voltage magnitude setpoint and a voltage angle setpoint, and
   wherein the current estimated power flow measurements include an estimated voltage magnitude and an estimated voltage angle.

20. A method implemented by one or more processors, comprising:
   generating, based on a graph of a power network, a virtual microgrid that includes a virtual point of interconnection (vPOI) and that includes automatically controllable resources based on the automatically controllable resources being topologically behind the vPOI;
   in response to generating the virtual microgrid:
      operating a virtual microgrid controller for the virtual microgrid, operating the virtual microgrid controller including:
         processing, using the virtual microgrid controller, power flow setpoints for the vPOI and estimated power flow measurements for the vPOI to generate control actions for achieving the power flow setpoints at the vPOI, and transmitting the generated control actions to one or more of the automatically controllable resources to achieve the power flow setpoints at the vPOI.

21. A system, comprising:

memory storing instructions;

one or more processors operable to execute the instructions to:

identify current power flow setpoints for a virtual point of interconnection (vPOI) for a virtual microgrid, the virtual microgrid including the vPOI and a plurality of electrical resources topologically behind the vPOI, the plurality of electrical resources including one or more automatically controllable resources;

generate current estimated power flow measurements for the vPOI, wherein in generating the current estimated power flow measurements one or more of the processors are to use a network model to estimate the current estimated power flow measurements and one or more of the processors do not utilize corresponding real measurements for all of the electrical resources topologically behind the vPOI;

generate, based on processing the current power flow setpoints and the current estimated power flow measurements using an integral action feedback controller, one or more control actions to achieve the current power flow setpoints, each of the control actions being for a respective one of the automatically controllable resources; and cause transmission of the one or more control actions to one or more of the automatically controllable resources that are topologically behind the vPOI.

\* \* \* \* \*